United States Patent
Murdock, Sr.

[11] 3,797,203
[45] Mar. 19, 1974

[54] MEANS FOR SEPARATING HEAVIER FROM LIGHTER COMPONENTS OF COMINGLED FLUID

[75] Inventor: Forrest Lee Murdock, Sr., Tulsa, Okla.

[73] Assignee: Fishmaster Products, Inc., Tulsa, Okla.

[22] Filed: Oct. 10, 1972

[21] Appl. No.: 296,343

[52] U.S. Cl. .................................. 55/176, 55/201
[51] Int. Cl. ........................................ B01d 19/00
[58] Field of Search .................... 55/45, 171–176, 55/185, 199, 201, 336, 421, 445; 210/521, DIG. 5

[56] References Cited
UNITED STATES PATENTS

| 653,012 | 7/1900 | Koyl | 210/521 |
| 3,208,204 | 9/1965 | Perrson | 55/445 |
| 3,664,093 | 5/1972 | Murdock, Sr. | 55/174 |
| 1,107,485 | 8/1914 | Bowser | 210/DIG. 5 |

*Primary Examiner*—Samih N. Zaharna
*Assistant Examiner*—Richard W. Burks
*Attorney, Agent, or Firm*—Head & Johnson

[57] ABSTRACT

Means for separating heavier from lighter components comingled in fluid including an upright vessel and a plurality of spaced conical separator screens vertically stacked within the vessel arranged such that lighter fluid components flowing through the vessel flow through the screens, each screen being a conically shaped foraminous reticulum of integrally formed relatively small width and small thickness strands, all of which are longitudinally downwardly inclined providing a multiplicity of continuous uninterrupted downwardly inclined paths on which heavier components may travel.

8 Claims, 4 Drawing Figures

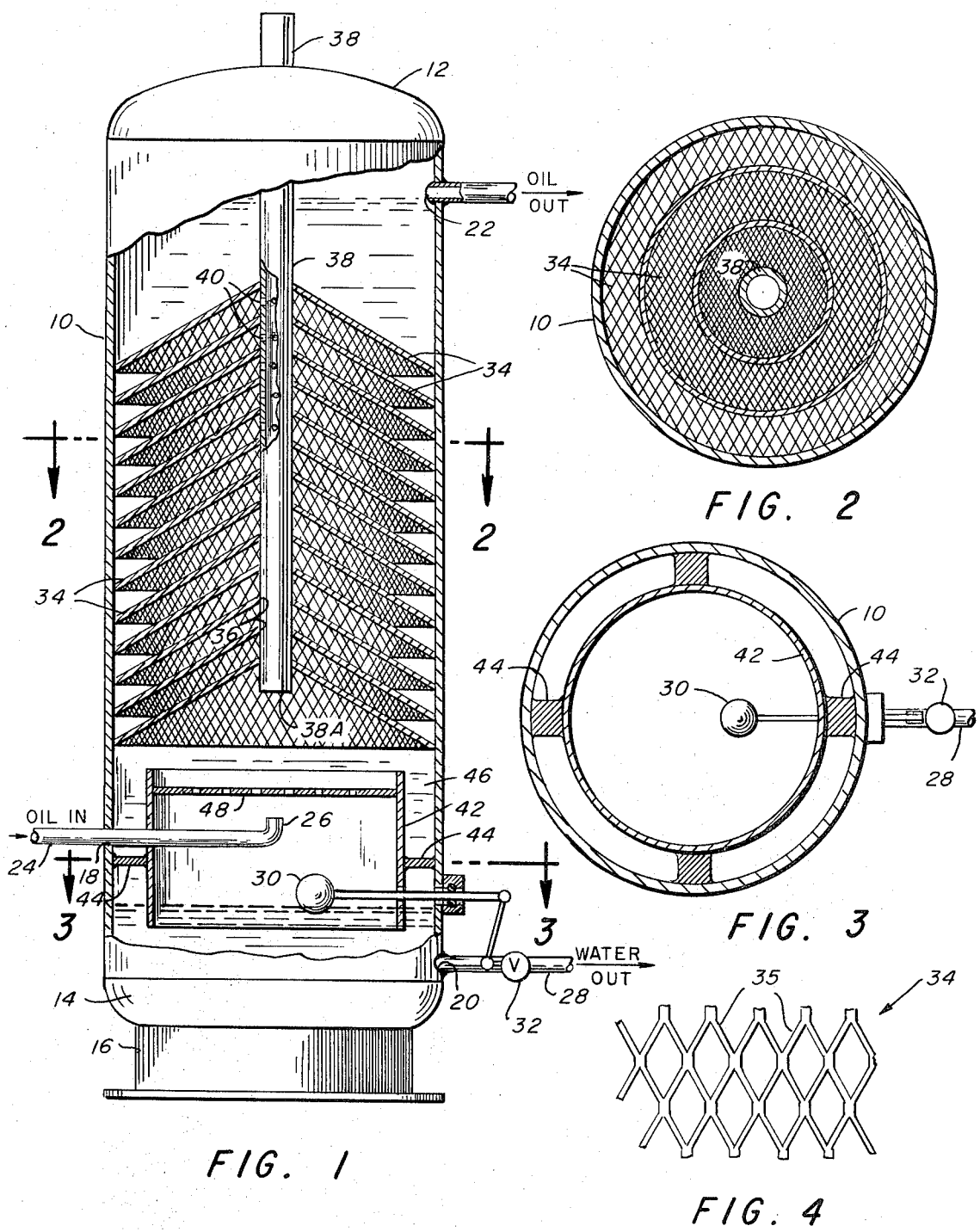

MEANS FOR SEPARATING HEAVIER FROM LIGHTER COMPONENTS OF COMINGLED FLUID

CROSS-REFERENCE

This is an improvement over U.S. Pat. No. 3,664,093, issued May 23, 1972, and entitled "Separator Vessel Having Multiple Parallel Separator Plates."

BACKGROUND, SUMMARY AND OBJECTS OF THE INVENTION

As set forth in the parent patent, a need exists for separating comingled immiscible fluids from each other in the chemical and petroleum industries. The parent patent sets forth a means for accomplishing this result, the specification and drawings being directed primarily towards vessels having a horizontal arrangement wherein fluids or gases pass generally horizontally to reach the outlets of the vessel. This disclosure solves the same problems as in the parent patent but is directed towards the provision of means of utilizing the concepts and advantages of the prior disclosure in a vertical vessel.

In many instances the use of a vertical vessel is desired over that of a horizontal vessel. A vertical separator vessel having a given fluid handling capacity normally consumes less space than a horizontal separator vessel having the same capacity. In addition, some separating problems are best solved utilizing the longer vertical flow paths provided by vertical vessels.

The invention to be described herein includes improved means for washing one liquid with another. As a specific example, some crude oil produced is so contaminated with salt that it is highly desirable that as much as possible of the salt be removed from the crude before movement through pipeline and processing equipment. For this reason it is sometimes necessary to wash the crude to remove as much as possible of the salt content. This is achieved by comingling fresh water, or water low on salt content, with the crude whereby the water absorbs the salt, or other water soluble contaminants from the crude, and the water is then separated from the crude and the crude is passed for further processing.

It is therefore an object of this invention to provide means of separating solids from fluids or gas, fluids from gas, and comingled immiscible fluids from each other, which means overcomes disadvantages of known type of separators.

Another specific object of this invention is to provide an improvement means of separating comingled immiscible fluids of divergent specific gravity in a vessel particularly arranged for vertical mounting.

Another object of this invention is to provide a means for washing one fluid with another to remove contaminants soluble in the wash fluid.

These as well as other objects of the invention will be fulfilled in the apparatus described in the attached description and claims, taken in conjunction with the attached drawings.

DESCRIPTION OF THE VIEWS

FIG. 1 is a side view of a vessel for practicing the invention, the vessel being shown partially cut away to reveal the internal arrangement.

FIG. 2 is a cross-sectional view taken along the line 2—2 of FIG. 1.

FIG. 3 is a cross-sectional view taken along the lines 3—3 of FIG. 1.

FIG. 4 is a fragmentary view of typical material of which the conical separator plates are formed.

DETAILED DESCRIPTION

Referring to the drawing, a vessel is illustrated by which the invention is typically practiced. The vessel 10 is upright and is illustrated as being cylindrical, however, the cylindrical configuration is not mandatory but is desirable from the standpoint of ease of construction. The upright vessel 10 has a top 12 and a bottom 14. A lower support 16 is provided upon which the vessel sits.

Vessel 10 includes a fluid inlet opening 18, a lower heavier fluid outlet 20, and an upper lighter fluid outlet 22. Fluid flows through inlet 18 in comingled condition and is separated in the vessel into a heavier component which flows through lower outlet 20 and the lighter component flows out through the upper outlet 22. As an example, crude oil entering fluid inlet 18 is separated within the vessel into water, the heavier component, which flows out outlet 20 and the petroleum component which flows out upper outlet 22. Provision may be made for removal of gas from the vessel although such is not shown as this step is well known in the art.

In the illustrated arrangement fluid flows through inlet 18 by way of an inlet conduit 24 which extends through opening 18 and which terminates centrally of the vessel 10 by an upturned portion 26. Heavier fluid, such as water, flows from outlet 20 by way of an outlet conduit 28. It is preferable to maintain an interface of heavier fluid in the lower portion of the vessel. For this purpose a float 30 is provided which extends sealably through the wall of vessel 10 to control a valve 32 in the outlet conduit 28. This is one known arrangement for controlling fluid level in the vessel and other means are well known in the art.

Positioned within the interior of vessel 10 above the inlet 18 is a plurality of spaced apart conical separator screens 34. Each of the separator screens is a conically shaped foraminous reticulum of integrally formed relatively small width and small thickness strands 35 of material, preferably metal, all of which strands 35 are longitudinally downwardly inclined towards the interior wall of vessel 10.

The conical separator screens may be formed of material such as expanded metal shown in FIG. 4. This material is typically formed by slitting and stretching sheet metal. Other similar materials having different configurations may be utilized within the keeping of the invention. The material must provide an integral reticulum of relatively small width and small thickness strands which are uninterrupted. The strands permit coalesced droplets of immiscible heavier liquids to form thereon and to travel downwardly towards the sides and bottom of the vessel, while the lighter fluid migrates upwardly towards the top of the vessel to be withdrawn through outlet opening 22.

While the number and spacing of the conical separator screens 34 may vary over a wide range according to the separating application, in principal there should be a relatively large number of such screens to provide a very great amount of contact area through which the fluid flows between inlet 18 and light fluid outlet 22 so as to provide the necessary surface area to cause the heavier fluid to coalesce and pass to the bottom of the vessel.

In the illustrated arrangement the conical separator screens are each provided with an opening 36 at the apex. The openings receive an elongated vertical central member 38. The central member 38 functions to stabilize the conical separator screens 34. In further particulars, the central member 38 may be, as illustrated, in the form of a conduit which extends through the top 10 of the vessel. Central member 38 may be tubular terminating at the lower end 38A. Said tubular component may serve not only to structurally stabilize the separator screens 34 but to permit gas to flow out of the vessel.

In an alternate arrangement the lower end 38A may be closed and the tubular central member 38 provided with apertures 40 therein. Wash water or other wash fluid, introduced into central member 38 flows outwardly through the apertures 40, between the conical separator screens 34 and downwardly within the vessel, contacting the upward flow of lighter fluid passing through the separator screens 34. Any contaminants soluble in the wash fluid (salt for example if the wash fluid is water) are dissolved in the wash fluid and carried to the bottom of the vessel for withdrawal through outlet 22.

In order to shield the downward flow of heavier fluid from the inlet flow of the comingled fluid a circular baffle 42 is provided, the baffle being open at the top and bottom and centrally supported within the lower portion of the vessel below the separator screens 34. Baffle 42 is supported by means of brackets 44. The circular baffle 42, which is preferably coaxial within cylindrical vessel 10, provides an annular area 46 through which the downward flow of heavier fluid may take place without disturbing or tending to intermix with the upward flow of fluid from inlet conduit 24. To spread the upward flow from inlet conduit 24 a perforated spreader plate 48 is positioned in the interior upper portion of baffle 42 above inlet conduit upturn portion 26.

Thus the invention described includes means of separating heavier from lighter components comingled into fluid in an arrangement utilizing an upstanding vessel and particularly, in an arrangement utilizing a plurality of conical separator screens.

While the invention has been described with a certain degree of particularity it is manifest that many changes may be made in the details of construction and the arrangement of components without departing from the spirit and the scope of this disclosure. The invention is not limited to the embodiment set forth herein for purposes of exemplification, but is to be limited only by the scope of the attached claim or claims, including full range of equivalency to which each element or step thereof is entitled.

What is claimed:

1. A means for separating heavier from lighter components comingled in fluid, comprising:
   an upright vessel having a fluid inlet, an upper lighter fluid outlet, and a lower heavier fluid outlet; and
   a plurality of spaced apart conical separator screens vertically stacked within said vessel above said fluid inlet opening and below said lighter fluid outlet opening arranged such that fluid flowing from said fluid inlet to said lighter fluid outlet flows through said screens, each separator screen being a conically shaped foraminous recticulm of integrally formed relatively small width and small thickness strands all of which strands are longitudinally downwardly inclined providing a multiplicity of continuous uninterrupted downwardly inclined paths on which heavier components may travel towards the lower portion of said vessel for discharge out said heavier fluid outlet; and
   centrally disposed baffle means secured within said vessel between said conical separator screens and said fluid inlet for separating the downward flow of heavier fluid components from the upward flow of comingled fluid through the fluid inlet.

2. A means for separating heavier from lighter components comingled in fluid according to claim 1 wherein said separator screens are formed of a conically shaped lattice of expanded metal.

3. A means for separating heavier from lighter components comingled in fluid according to claim 1 wherein said separator screens are formed of slit and stretched expanded metal, the apertures therein being of diamond shape.

4. A means for separating heavier from lighter components comingled in fluid according to claim 1 wherein each of said conical separator screens has an opening therein at the apex, the opening being coaxial with the conical separator screen, and including:
   an elongated vertical central member received in said conical members axial opening.

5. A means for separating heavier from lighter components comingled in fluid according to claim 4 wherein said conical members are attached to said central member.

6. A means for separating heavier from lighter components comingled in fluid according to claim 4 wherein said central member is tubular and wherein said vessel has an opening in the upper end thereof, said tubular central member communicating with the exterior of said vessel through said opening.

7. A means for separating heavier from lighter components comingled in fluid, comprising:
   an upright vessel having a fluid inlet, an upper lighter fluid outlet, and a lower heavier fluid outlet; and
   a plurality of spaced apart conical separator screens vertically stacked within said vessel above said fluid inlet opening and below said lighter fluid outlet opening arranged such that fluid flowing from said fluid inlet to said lighter fluid outlet flows through said screens, each separator screen being a conically shaped foraminous reticulum of integrally formed relatively small width and small thickness strands all of which strands are longitudinally downwardly inclined providing a multiplicity of continuous uninterrupted downwardly inclined paths on which heavier components may travel towards the lower portion of said vessel for discharge out said heavier fluid outlet, wherein each of said conical separator screens has an opening therein at the apex, the opening being coaxial with the conical separator screen, and including:
   an elongated vertical central member received in said conical members axial opening, said central member being tubular and wherein said vessel has an opening in the upper end thereof, said tubular central member communicating with the exterior of said vessel through said opening, and said central member has apertures therein communicating the interior of the central member with the interior of said vessel between each of said separator screens.

8. A means for separating heavier from lighter components comingled in fluid, comprising:
an upright vessel having a fluid inlet, an upper lighter fluid outlet, and a lower heavier fluid outlet; and
a plurality of spaced apart conical separator screens vertically stacked within said vessel above said fluid inlet opening and below said lighter fluid outlet opening arranged such that fluid flowing from said fluid inlet to said lighter fluid outlet flows through said screens, each separator screen being a conically shaped foraminous reticulum of integrally formed relatively small width and small thickness strands all of which strands are longitudinally downwardly inclined providing a multiplicity of continuous uninterrupted downwardly inclined paths on which heavier components may travel towards the lower portion of said vessel for discharge out said heavier fluid outlet; and
a circumferential upright, opened top and bottom baffle supported centrally within said vessel below said conical separator screens and providing an annular area between the exterior of the baffle and the interior of said vessel.

* * * * *